(12) United States Patent
Chen

(10) Patent No.: US 8,887,307 B2
(45) Date of Patent: Nov. 11, 2014

(54) METHOD AND SYSTEM FOR USING LOCATION INFORMATION ACQUIRED FROM GPS FOR SECURE AUTHENTICATION

(75) Inventor: Xuemin (Sherman) Chen, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 1453 days.

(21) Appl. No.: 11/871,696

(22) Filed: Oct. 12, 2007

(65) Prior Publication Data

US 2009/0100530 A1  Apr. 16, 2009

(51) Int. Cl.
- *H04L 29/06* (2006.01)
- *H04L 9/32* (2006.01)
- *H04L 9/06* (2006.01)

(52) U.S. Cl.
CPC ........... *H04L 63/083* (2013.01); *H04L 2209/60* (2013.01); *H04L 2209/12* (2013.01); *H04L 63/107* (2013.01); *H04L 9/3226* (2013.01); *H04L 9/3271* (2013.01); *H04L 2209/80* (2013.01); *H04L 9/0662* (2013.01)
USPC ................. 726/29; 726/2; 713/169; 713/176; 725/25; 725/30

(58) Field of Classification Search
USPC ............................................ 713/169; 726/29
See application file for complete search history.

(56) References Cited

U.S. PATENT DOCUMENTS

| | | | |
|---|---|---|---|
| 7,003,674 B1 * | 2/2006 | Hamlin | 713/193 |
| 7,212,806 B2 | 5/2007 | Karaoguz | |
| 2002/0137524 A1 | 9/2002 | Bade et al. | |
| 2002/0154777 A1 * | 10/2002 | Candelore | 380/258 |
| 2003/0070067 A1 * | 4/2003 | Saito | 713/150 |
| 2003/0145203 A1 | 7/2003 | Audebert et al. | |
| 2003/0154355 A1 | 8/2003 | Fernandez | |

(Continued)

FOREIGN PATENT DOCUMENTS

| | | |
|---|---|---|
| CA | 2398323 A1 | 8/2000 |
| CN | 1444835 | 9/2003 |

(Continued)

OTHER PUBLICATIONS

Siddiqui et al., "A Set-top Box for End-to-end QoS Management and Home Network Gateway in IMS", 2009, pp. 527-534.*

(Continued)

*Primary Examiner* — Thanhnga B Truong
*Assistant Examiner* — Thaddeus Plecha
(74) *Attorney, Agent, or Firm* — Sterne Kessler Goldstein & Fox P.L.L.C.

(57) ABSTRACT

Secure functions may be accessed via an authentication process utilizing a password that may be generated within a chip integrated on a device. The password may be unique per chip location, per challenge and/or per chip. The location of the chip may be determined based on GPS information and securely stored and securely communicated to an external entity. Two or more of the chip location, a generated random number sample and a key from a table of keys may be passed to a hash function that may generate a password. An external entity attempting access may be challenged to respond with a password that matches the password generated by the hash function. The response may be compared with the password generated by the hash function and access to one or more secure functions may be granted based on the comparison.

26 Claims, 6 Drawing Sheets

(56) References Cited

U.S. PATENT DOCUMENTS

| | | |
|---|---|---|
| 2003/0163787 A1 | 8/2003 | Hay et al. |
| 2004/0066278 A1 | 4/2004 | Hughes |
| 2004/0158708 A1 | 8/2004 | Peyravian et al. |
| 2005/0071671 A1* | 3/2005 | Karaoguz .................. 713/200 |
| 2005/0182948 A1 | 8/2005 | Ducharme |
| 2006/0107316 A1 | 5/2006 | Fiske |
| 2007/0157023 A1* | 7/2007 | Kotzin ..................... 713/168 |
| 2007/0162759 A1* | 7/2007 | Buskey et al. ............. 713/182 |
| 2007/0209072 A1 | 9/2007 | Chen |
| 2008/0263362 A1 | 10/2008 | Chen |
| 2009/0019530 A1* | 1/2009 | Keeler et al. .................. 726/4 |
| 2009/0031409 A1* | 1/2009 | Murray ....................... 726/10 |

FOREIGN PATENT DOCUMENTS

| | | |
|---|---|---|
| CN | 1889434 A | 1/2007 |
| JP | 2004-172865 | 6/2004 |
| KR | 200468472 | 7/2004 |
| WO | WO 9804967 | 2/1998 |
| WO | WO 00/48060 A1 | 8/2000 |
| WO | WO2007/204170 A1 | 3/2007 |

OTHER PUBLICATIONS

Gassend et al., "Identification and authentication of integrated circuits", 2004, pp. 1077-1098.*

Extended European Search Report for EP Application No. EP 08 01 7660, The Hague, The Netherlands, mailed on Mar. 23, 2012; 6 pages.

Nystrom, Brainard. "The SecurID SASL Mechanism." Jan. 1999. http://tools.ietf.org/html/draft-nystrom-securid-sasl-00. pp. 1-11.

A. Menzes, P. van Oorschot, and S. Vanstone, "Chapter 10, Identification and Entity Authentication" from Handbook of Applied Cryptography, CRC Press, 1996, Oct. 1, 1996, CRC Press Series on Discrete Mathematics and its Applications, Boca Raton, FL, US, pp. 385-424, XP001525010, ISBN: 978-0-8493-8523-0, URL: http://www.cacr.math.uwaterloo.ca/hac.

EPO Communication dated Aug. 1, 2011 in Application No. 08005228.5-1245/1983466 (6 pages).

* cited by examiner

METHOD AND SYSTEM FOR USING LOCATION INFORMATION ACQUIRED FROM GPS FOR SECURE AUTHENTICATION

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to secure communication systems. More specifically, certain embodiments of the invention relate to a method and system for using location information acquired from GPS for secure authentication.

BACKGROUND OF THE INVENTION

Industry standards provide the necessary protocols and infrastructure that may be used for delivering digital television or DVD content with audio, video and data signals. These streams may be processed by various functions and operations within broadband networks, head-end and terminal devices such as set-top boxes (STB), and media devices such as DVD. These various functions and operations may for example involve access to sensitive areas of the device such as scan access, system buses and system interfaces and may benefit from some form of security or user authentication mechanism.

Various secure functions and operations may be protected by secure authentication mechanisms. Secure authentication operations for a class of electronic devices and for a specific application, usually require each device to authenticate for a single user. The device may be, for example, a set-top-box (STB) that may be implemented as a system on a chip (SOC). Applications, such as accessing system buses and interfaces, may be enabled by a user providing special information that may confirm his or her identity. The special information may be a password or may be a response to a challenge from the device.

Passwords are the most popular authentication mechanism. They make use of knowledge a user has. The user supplies a password and a device may validate it. If the password is verified to be associated with a user, the user's identity is authenticated. If not, the password is rejected and authentication fails.

For many applications, such as a secure download operation, a password may be discovered by an unauthorized user during an operation and may then be utilized for gaining access during subsequent operations of the same type.

In order to ensure secure communication, transmitted streams may need to be protected during transmission to devices such as STB. Upon receipt of the transmitted steams, one or more devices within the STB may need to provide secure access for the streams.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and system for using location information acquired from GPS for secure authentication, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for using location information acquired from the Global Positioning System (GPS) for secure authentication. Aspects of the invention may comprise a device, for example, a set-top-box (STB) that may be enabled to receive GPS data and to determine its location. Furthermore, the device may be enabled to securely store the location information and to securely send the location information to another entity that may be authorized to access the device, such as an upstream server, via a modem. The device may utilize an authentication process comprising password generation and password verification for allowing the other entity to gain access to various secure functions or operations on the device such as scan access, JTAG, EJTAG, PCI and EBI and to prevent unauthorized entities from gaining access. A password may be generated from the determined location information as well as from, for example, a random number sample and/or a look up value or key. Accordingly, during authentication the device may send a challenge to the other entity such that the other entity may generate a valid password and to send it to the device in a challenge response. The device may receive the challenge response password from the other entity and may verify it by comparing it with a password generated on the device. Entities that are authorized for access to the various secure functions and operations on the device may be given some of the information needed for password generation prior the time of authentication. For example, entities authorized for access to the device may have knowledge of the device ID, location information, keys and key indices and the method for generating a valid password.

Figure 1A:
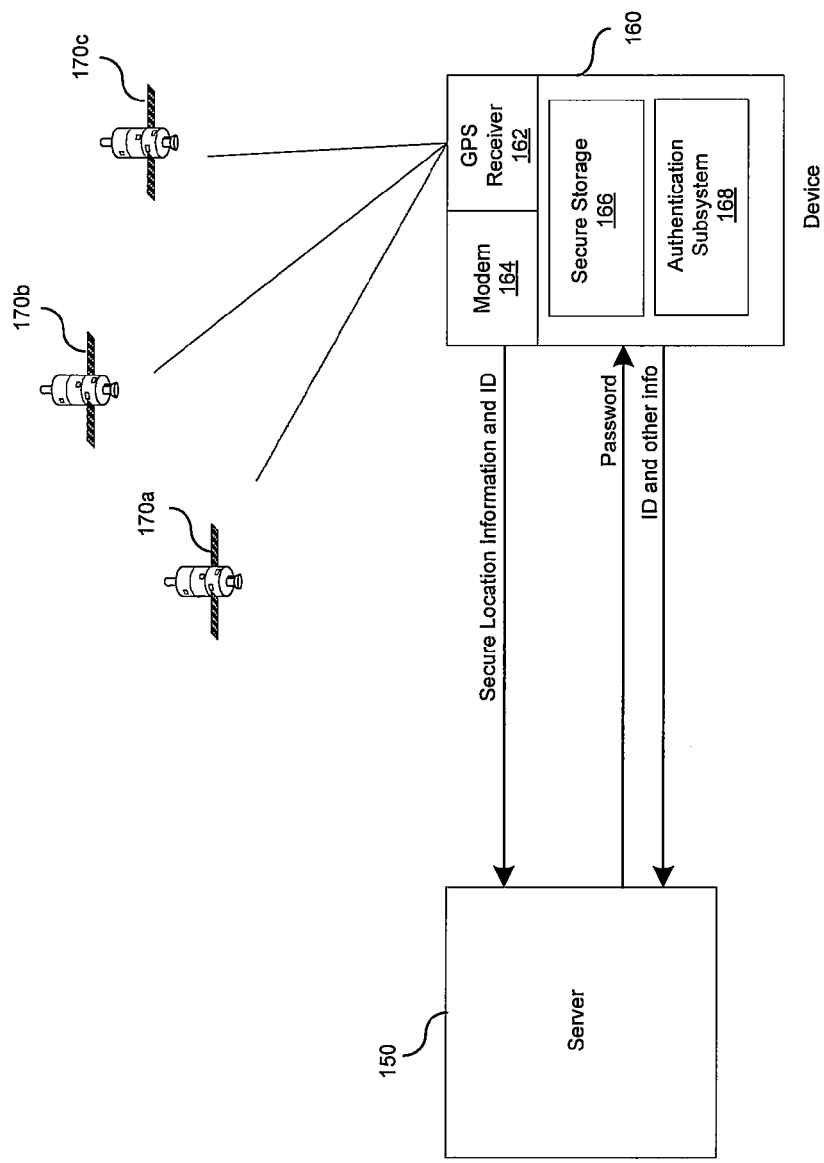
FIG. 1A is a block diagram that illustrates an exemplary system enabled to utilize GPS location information for authentication, in accordance with an embodiment of the invention

FIG. 1A is a block diagram that illustrates an exemplary system enabled to utilize GPS location information for authentication, in accordance with an embodiment of the invention. Referring to FIG. 1A, there is shown a server 150, a device 160 comprising a GPS receiver 162, a modem 164, non-volatile memory (NVM) 166, an authentication subsystem 168 and satellites 170a, 170b and 170c.

The server 150 may be communicatively coupled with the device 160 and may comprise suitable logic, circuitry and/or code that may be enabled to exchange secure communications as well as unsecured communications with the device 150. For example, the server 150 may be part of a service provider network and may transmit audio/video data to the device 150. The server 150 may be enabled to gain access to secure functionality and operations on the device 160. In this regard, the server 150 may be enabled to generate, for example, a challenge response password for authentication.

The device 160 may be, for example, a set-top-box (STB) communicatively coupled with the server 150 and may comprise suitable logic, circuitry and/or code that may be enabled to exchange secure communications with the server 150. The device 160 may comprise a GPS receiver 162, the latter of which may comprise suitable logic, circuitry and/or code that may be enabled to receive GPS data from one or more GPS satellites and may be enabled to determine the device 160's position from the received GPS data. For example the GPS receiver 160 may determine device 160's position based on ephemeris, signal delay and satellite position. In some embodiments of the invention, other sources of location or timing information may be utilized to determine the location of the device. For example, user input or input from another position or time referencing system may be utilized. Accordingly, the device 160 may comprise the NVM 166 that may be utilized to securely store device 160 location information in an encrypted, scrambled or obfuscated form for example, that may be used for generating a password. Moreover, the device 160 may comprise a modem enabled to transmit secure information such as device ID and device location information to the server 150.

The authentication subsystem 168 may be enabled to control access to secure functions or operations on the device 160. In this regard, the authentication subsystem 168 may be enabled to generate a verification password utilizing device 160's location information. The authentication subsystem 168 may maintain a database that pairs for example, the device ID and device location information for device 160. Moreover, the authentication subsystem 168 may challenge another entity such as the server 150 that may be attempting to gain access and may request authentication from the device 160, to return a valid password in a challenge response. The authentication subsystem may be enabled to compare the received challenge response password with the verification password it generated and may allow the other entity to gain access to the secure functions or operations if the passwords match.

The satellites 170a, 170b and 170b may be for example, GPS satellites that may provide information to the device 160 to enable the device 160 determine its location. In this regard, each of the satellites 170a, 170b and 170c may transmit a signal that may be received in the GPS receiver 162. The GPS receiver 162 may determine the distance from the device 160 and one or more satellites by measuring the delay between each signal's transmission time and each signal's reception time. Moreover, the signals may carry information such as precise timing information and/or ephemeris information that may indicate a location for the respective satellite 170a, 170b and/or 170c transmitting the signal. If the device 160 receives signals from three or more satellites it may determine its position from the ephemeris, delay measurements and satellite positions. Input from a user and/or long term orbit information (LTO), for example, may enable the device 160 to determine a position with fewer than three satellite signals.

In operation, the device 160 may determine its location based on information received from one or more of the satellites 170a, 170b and 170c. Location information of the device 160 may be securely stored in the NVM 166 in an encrypted, scrambled or obfuscated form for example. The location information and device ID of the device 160 may be paired to enable password generation. One or more of the location information and device ID may be securely sent to the server 150 via the modem 164. This secure transmission may be done at the time of device set-up or configuration. If the location of the device 160 changes, a new location may be determined and may be sent securely via the modem 164 to the server 150. The server 150 may securely store the location information and/or device ID for device 160 and may maintain a data base for pairing location information and device IDs for at least the device 160. When the server 150 attempts to gain access to protected functions or operations on the device 150, the device 160 may challenge the server 150 to send a valid password to the device 160 in a challenge response. The device 160 may receive the challenge response password and may compare it to a password generated on the device 160. If the comparison is successful, the server 150 may gain access to the device 160 secure functions and/or operations. If location information is not available, alternative methods may be utilized to generate passwords.

Figure 1B:
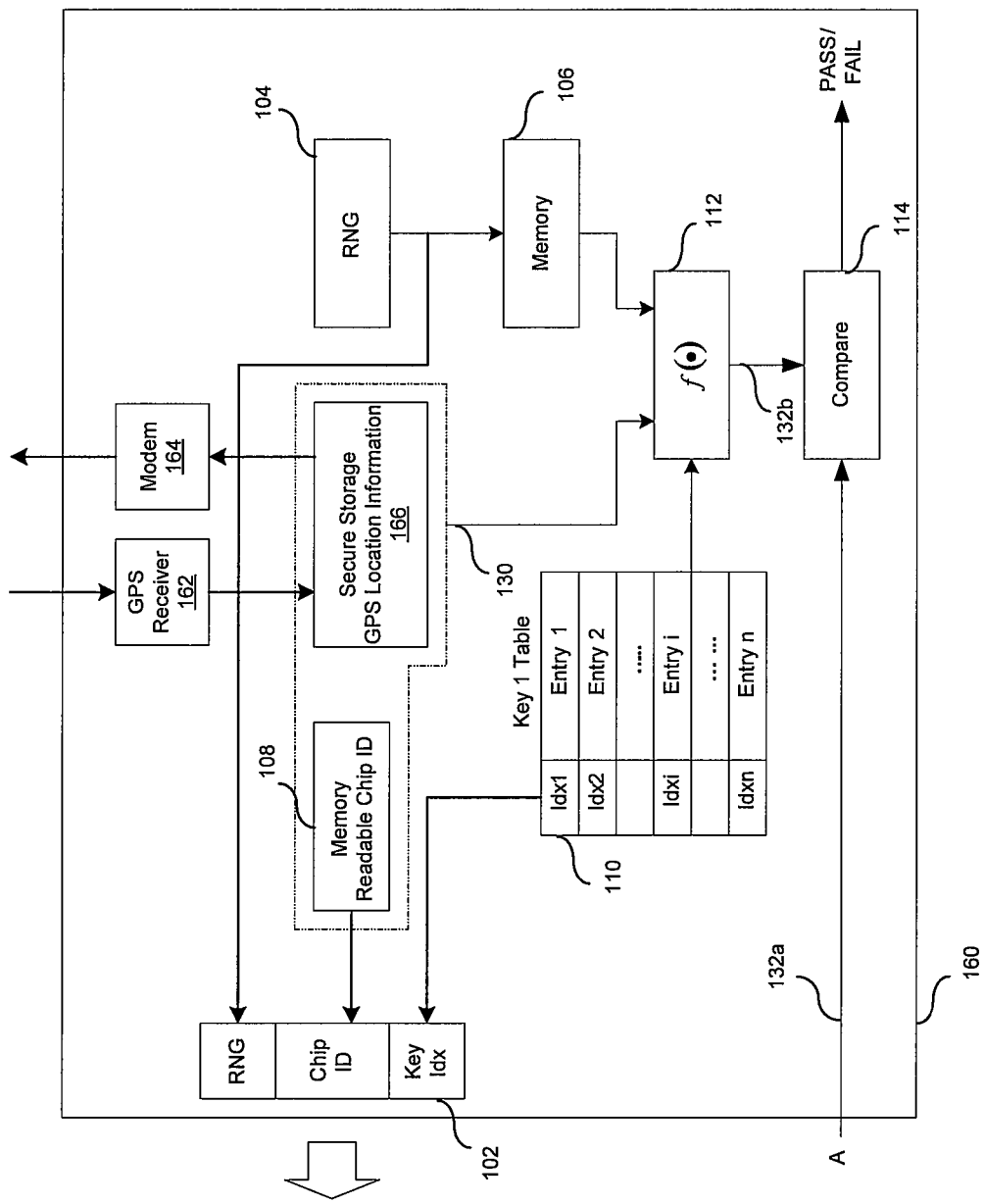
FIG. 1B is a block diagram that illustrates an exemplary device with internal re-writable NVM that is enabled to utilize GPS location information in its authentication process, in accordance with an embodiment of the invention.

FIG. 1B is a block diagram that illustrates an exemplary device that is enabled to utilize GPS location information within its authentication process, in accordance with an embodiment of the invention. Referring to FIG. 1B, there is shown a device 160 that may comprise a challenge register 102, a random number generator (RNG) 104, a plurality of local non-volatile memory (NVM) units 108, 110, internal re-writable memory 106, an encryption unit 112, a digital comparator unit 114, a NVM 166, a GPS receiver 162 and a modem 164. The boundary of the device 160 is shown.

The device 160, NVM 166, GPS receiver 162 and modem 164 may be similar or substantially the same as the device 160, NVM 166, GPS receiver 162 and modem 164 described with respect to FIG. 1A. The NVM 166 may be communicatively coupled with the GPS receiver 162, the modem 164 and the encryption unit 112.

The challenge register 102 may comprise suitable storage for a random number sample generated by the RNG 104, chip ID and a key table index. The challenge register 102 comprises suitable circuitry, logic and/or codes and may be adapted to exchange information between the device 160 and an external entity such as the server 150 described in FIG. 1A that may request authentication. The challenge register 102 may be communicatively coupled to the RNG 104 and to memories 108 and 110.

The RNG 104 may be communicatively coupled to the challenge register 102 and internal re-writable memory 106.

The RNG 104 comprises suitable circuitry, logic and/or code and may be adapted to generate random number samples.

The NVM 108 may comprise suitable storage for the chip ID and may be communicatively coupled to the challenge register 102. The chip ID may be paired with location information for the device 160 for password generation. The NVM 108 may utilize any type of NVM storage technology such as PROM, Flash or EEPROM.

The internal re-writable memory 106 may comprise storage for output from the random number generator 104. The internal re-writable memory 106 may be re-writable RAM or may be re-writable NVM and may utilize any type of suitable storage technology, such as Flash or EEPROM. The internal re-writable memory 106 may be communicatively coupled to the RNG 104 and the encryption unit 112.

The NVM 110 may comprise suitable logic, circuitry, and/or code that may enable storage of keys and associated key indices. The NVM 110 may enable communicating the keys to the encryption unit 112 as well as communicating key indices to the challenge register 102. The NVM 110 and use of keys and key indices may be optional. For example, if the encryption unit 112 utilizes a hashing function, a key may not be required for password generation. In this regard a key index of zero may indicate that a key may not be required for password generation.

The encryption unit 112 may comprise suitable logic, circuitry, and/or code that may enable the generation of a password from a plurality of input data. In some embodiments of the invention, the encryption unit 112 may be enabled to encrypt data from a plurality of sources, for example, the location information from NVM 166, a random number sample from internal re-writable memory 106 and a key from NVM 110, to generate a password. In some embodiments of the invention, the encryption unit 112 may comprise suitable logic, circuitry, and/or code to enable use of a hashing function for example, SHA2 family such as SHA-224, SHA-265, SHA-384, SHA 512 and HMAC-SHA for example. In this regard, a key from NVM 110 may not be needed and only location information from the NVM 166 and a random number sample from internal re-writable memory 106 may be utilized to generate a password. If location information is not available for generation of a password, two or more of the chip ID from NVM 108, a key from NVM 110 and a random number sample from internal re-writable memory 106 may be utilized to generate a password for example.

The digital comparator 114 may comprise suitable logic, circuitry, and/or code that may be adapted to receive a password from an external entity such as the server 150 and from a password generated by the encryption unit 112. The digital comparator 114 may comprise suitable logic, circuitry, and/or code that may be adapted to compare two passwords and output an authentication pass or fail indication.

In operation, the device 160 may determine its location based on information received from one or more of the satellites 170a, 170b and 170c. Location information for the device 160 may be securely stored in the NVM 166 in an encrypted, scrambled or obfuscated form for example. The location information and device ID of the device 160 may be paired to enable password generation. One or more of the location information and device ID may be securely sent to the server 150 via the modem 164. This secure transmission may be done at the time of device set-up or configuration. If the location of the device 160 changes, a new location may be determined and may be sent securely via the modem 164 to the server 150. Upon request for authentication from an external entity such as the server 150, a random number sample may be generated within RNG 104. The random number sample generated by the RNG 104, the chip ID from the NVM 108 and a key index from NVM 110 may be communicated to the challenge register 102. Then, the contents of the challenge register 102 may be sent to the external entity in a challenge message so that the external entity may generate a password and return it in a challenge response to the device 160. The external entity may receive the contents of the challenge register 102 and may pair the chip ID with the device 160's location information stored on the external entity and may generate the password. Within the device 160, the random number sample generated in the RNG 104 may be stored in internal re-writable memory 106. The location information from NVM 166, random number sample from internal re-writable memory 106 and the key at location key index in 110 may be communicated to the encryption unit 112. The encryption unit 112 may utilize a hashing function to generate the password. The digital comparator 114 may receive the password from encryption unit 112 and the password from the external entity 200 and compare them. The device 160 may determine whether the authentication has passed or failed.

Figure 1C:
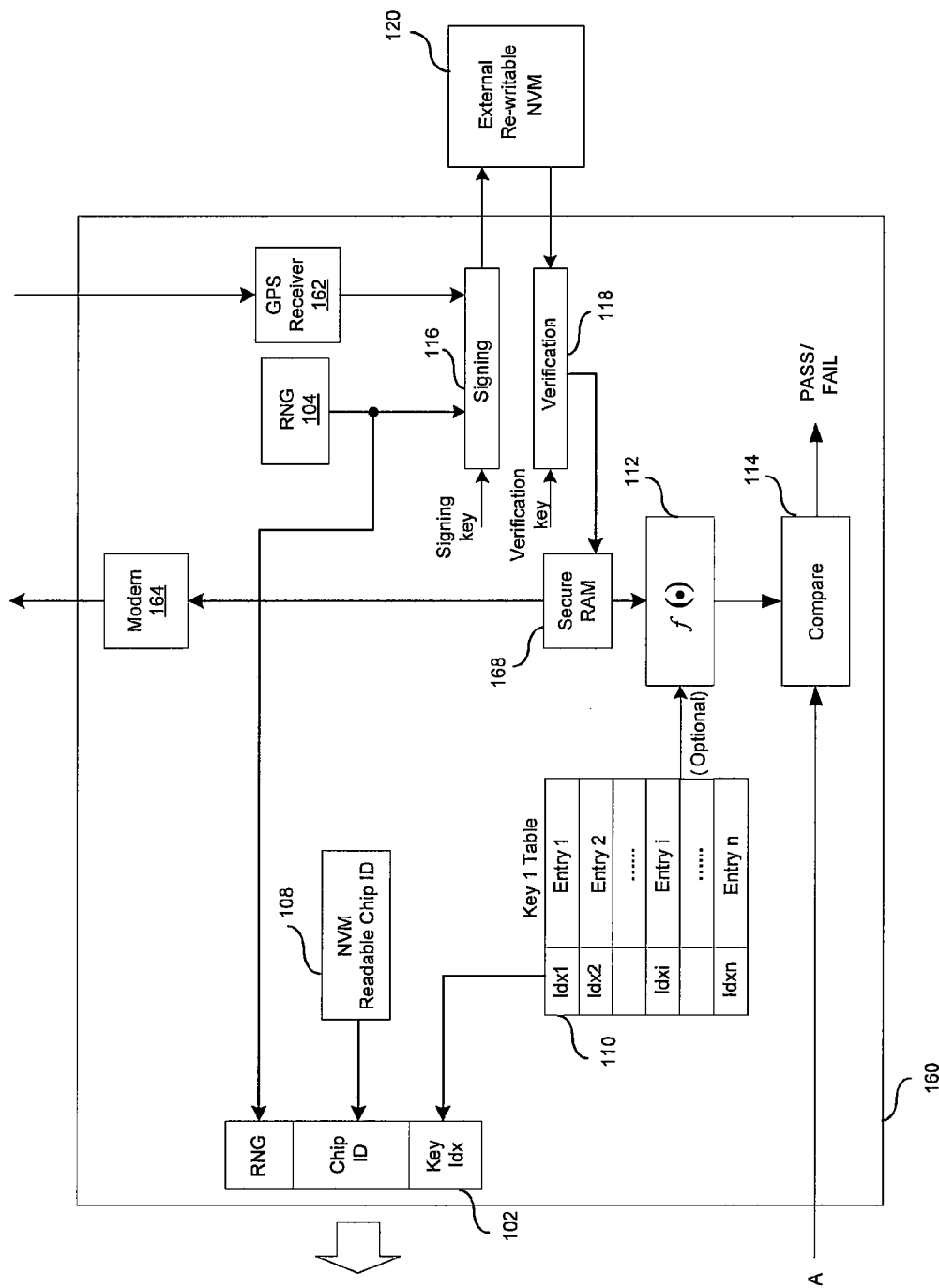
FIG. 1C is a block diagram that illustrates an exemplary device with external re-writable NVM that is enabled to utilize GPS location information in its authentication process, in accordance with an embodiment of the invention.

FIG. 1C is a block diagram that illustrates an exemplary device with external re-writable NVM that is enabled to utilize GPS location information in its authentication process, in accordance with an embodiment of the invention. Referring to FIG. 1C, there is shown the device 160 that may comprise the challenge register 102, the RNG 104, the plurality of local NVM 108, 110, an external re-writable NVM 120, the encryption unit 112, the digital comparator unit 114, a signing unit 116, a verification unit 118, a GPS receiver 162, a modem 164 and a secure RAM 168. The device 160 as well as the challenge register 102, the RNG 104, the plurality of local NVM 108, 110, the encryption unit 112, the comparator unit 114, the GPS receiver 162 and the modem 164 may be described similarly to and respectively with FIG. 1A and FIG. 1B, the device 160, the challenge register 102, the RNG 104, the plurality of local NVM 108, 110, the encryption unit 112, the comparator unit 114, the GPS receiver 162 and the modem 164.

The signing unit 116 may comprise suitable logic, circuitry, and/or code that may be adapted to encrypt and sign the random number sample output from the RNG 104 as well as location information from the GPS receiver 162. In this regard, the random number sample and/or location information may be encrypted prior to signing in the signing unit 116 with for example advanced encryption standard (AES) or data encryption standard (DES). The signing unit 116 may sign the encrypted random number sample and encrypted location information utilizing an asymmetric algorithm such as RSA, DSA or a symmetric algorithm such as HMAC using an embedded signing key. The signing unit 116 may comprise suitable logic, circuitry, and/or code that may be adapted to exchange information with an external re-writable NVM 120 for storage of the signed encrypted random number sample and/or signed encrypted location information. In another aspect of the invention, the signing key may be encrypted as well and stored on the external re-writable NVM 120.

The external re-writable NVM 120 may comprise a storage device, which may comprise suitable logic, circuitry, and/or code that may be adapted to exchange data with the device. The external re-writable NVM 120 may comprise storage for the signed encrypted random number and/or signed encrypted location information from the signing unit 116. The external re-writable NVM 120 may be based, for example, on Flash storage technology. In one aspect of the invention, the signing and verification keys may be encrypted and may be stored in external re-writable NVM 120

The verification unit 118 may comprise suitable logic, circuitry, and/or code that may be adapted to receive a verification key and the signed encrypted random number sample and/or signed encrypted location information from external re-writable NVM 120 and may decipher the signed encrypted random number sample and signed encrypted location information. The verification unit 118 may comprise suitable logic, circuitry, and/or code that may be adapted to exchange information with the secure RAM 168.

The secure RAM 168 may comprise suitable logic, circuitry, and/or code that may be adapted to exchange information with the encryption unit 112, the verification unit 118 and the modem 164. In addition the secure RAM 168 may be enabled to securely store the random number and location information.

In operation, the random number sample may be generated within RNG 104. The random number sample from the RNG 104, chip ID from NVM 108 and key index from the NVM 110 may be communicated to the challenge register 102. Then the contents of the challenge register 102 may be sent to an external entity such as the server 150 shown in FIG. 1A in a challenge message so that the external entity may generate a password and return it in a challenge response. The random number sample generated in the RNG 104 and/or the location information from the GPS receiver 162 may be encrypted prior to signing in the signing unit 116 with for example advanced encryption standard (AES) or data encryption standard (DES). The encrypted random number sample and/or the encrypted location information may be signed by the signing unit 116 and stored in external re-writable NVM 120. The key at location key index in the NVM 110 may be communicated to the encryption unit 112. The signed encrypted random number sample and/or the signed encrypted location information stored in external re-writable NVM 120 may be returned to the device 160 more specifically to the verification unit 118 where they may be verified. The verified random number sample and location information may be decrypted and forwarded to the encryption unit 112. The encryption unit 112 may utilize a hash function to generate the password. The digital comparator 114 may receive the password from the encryption unit 112 and the password from the external entity for example the server shown in FIG. 1A and may compare them. The device may determine if the authentication has passed or failed.

Figure 2:
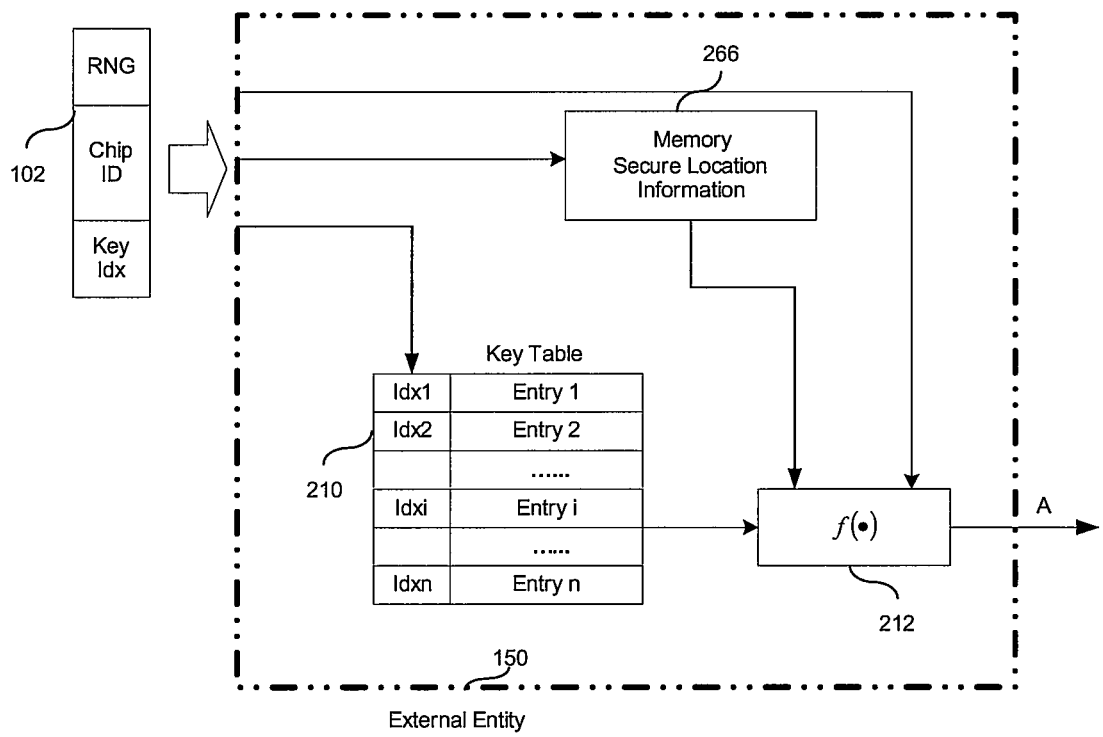
FIG. 2 is a block diagram that illustrates an exemplary external entity seeking authentication that may utilize GPS location information, in accordance with an embodiment of the invention.

FIG. 2 is a block diagram that illustrates an exemplary external entity seeking authentication that may utilize GPS location information, in accordance with an embodiment of the invention. Referring to FIG. 2, there is shown the external entity 150 that may comprise NVM 266, NVM 210, and an encryption unit 212. The boundary of the external entity 150 is shown.

The NVM 266 may comprise suitable logic, circuitry, and/or code that may be adapted to receive secure data such as device ID and/or secure location information described in FIGS. 1A, 1B and 1C and store the secure data. In addition the NVM 266 may be enabled to associate the received device ID with the location information of the sending device 160 in a database for example. The NVM 266 may be communicatively coupled to the encryption unit 212.

The NVM 210 may comprise suitable logic, circuitry, and/or code that may enable storage of data such as keys and associated key indices for password generation. The NVM 210 may be utilized to look up a key and communicate that key to the encryption unit 212. Data from NVM 210 may not be needed for generation of a password if the encryption unit 212 and the encryption unit 112 on the device 160 utilize a hashing function. In this regard a key index of zero may be utilized to indicate that a key from NVM 210 need not be sent to the encryption unit 212.

The encryption unit 212 may comprise suitable logic, circuitry, and/or code that may enable the generation of a password from a plurality of input data. In exemplary embodiment of the invention, the encryption unit 212 may generate a password by encrypting data from a plurality of sources: location information from 266, a random number sample received from the challenge register 102 on the device 160 shown in FIGS. 1A, 1B and 1C and a key from the NVM 110. In another embodiment of the invention, the encryption unit 212 may comprise suitable logic, circuitry, and/or code that may be enabled to utilize a hash function, for example, SHA2 family such as SHA-224, SHA-265, SHA-384, SHA 512 and HMAC-SHA for example. In this regard, data from two sources may be utilized to generate the password: the location information from NVM 266 and the random number sample received from the challenge register 102 on the device 160 shown in FIGS. 1A, 1B and 1C.

In operation, during authentication, data may be received from the device 160 challenge register 102 comprising the random number sample, device ID and key index. The received device ID may be associated with the device location information that may be stored in NVM 266. The received key index may be utilized to look-up a corresponding key in the NVM 210. Accordingly, the location information from NVM 266, the key from NVM 210 and the random number sample received from the challenge register 102 may be communicated to the encryption unit 212. The encryption unit 212 may utilize a function such as a hash function to generate a challenge response password. The challenge response password may be sent to the device 160 shown in FIGS. 1A, 1B and 1C for authentication.

Figure 3A:
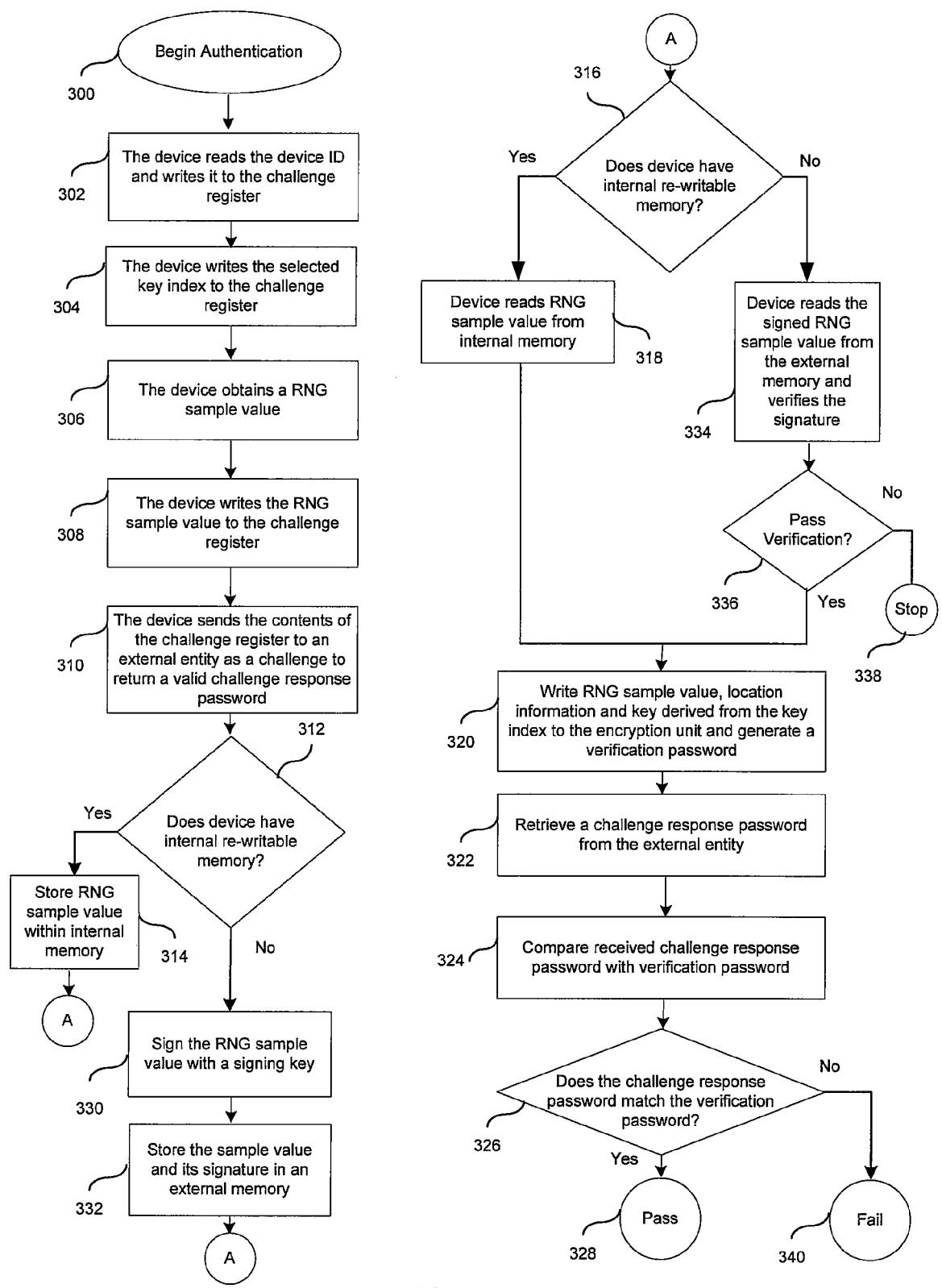
FIG. 3A is a flow chart that illustrates exemplary steps for an authentication process that may utilize GPS location information on a device, in accordance with an embodiment of the invention.

FIG. 3A is a flow chart that illustrates exemplary steps for an authentication process that may utilize GPS location information on a device, in accordance with an embodiment of the invention. Referring to FIG. 3A, there is shown a flow chart wherein step 300 refers to the beginning of an authentication operation on the device 160 shown in FIGS. 1A, 1B and 1B. In step 302, the device 160 reads the device ID from NVM 108 and writes it to the challenge register 102. In step 304, the device 160 selects a key index from the NVM 110 and writes it to the challenge register 102. In step 306, the device 160 obtains a random number generator (RNG) sample from RNG 104 and writes it to the challenge register 102. In step 310, the device sends the contents of the challenge register to an external entity such as the server 150 as a challenge to return a valid challenge response password. In step 312, if the device has internal re-writable NVM, the process proceeds to step 314. In step 314, the RNG value is stored in internal re-writable memory 106. In step 316, if the device has internal re-writable NVM, the process proceeds to step 318. In step 318, the device reads the RNG sample value from the internal memory 106. In step 320, the device writes the RNG sample value from internal re-writable memory 106, location information from NVM 166 and a key indicated by the selected key index from NVM 110 to the encryption unit 112 wherein a verification password may be generated. In step 322, the device 160 may retrieve a challenge response password from the external entity. In step 324, the device 160 may compare the retrieved challenge response password with the verification password. In step 326, if the challenge response password from the external entity matches the verification password generated on the device 160, the process may proceed to step 328 and the authentication may be successful.

In step 312, if the device 160 does not have internal re-writable NVM, the process may proceed to step 330. In step 330, the device 160 may sign the RNG sample value with a signing key in signing block 116. In step 332, the device may store the RNG sample value and its signature in the external re-writable NVM 120 and the process may proceed to step 316. In step 316, if the device does not have internal re-writeable NVM, the process may proceed to step 334. In step 334, the device 160 may read the signed RNG sample value from the external re-writable NVM 120 and may verify the signature in verification block 118. In step 336, if the verification passes, the process may proceed to step 320. In step 336, if the verification fails, the process may proceed to step 338 and stop.

In step 326, if the challenge response password from the external entity does not match the verification password generated on the device 160, the process may proceed to step 340 and authentication may fail. An indication of the failed authentication may be provided.

Figure 3B:
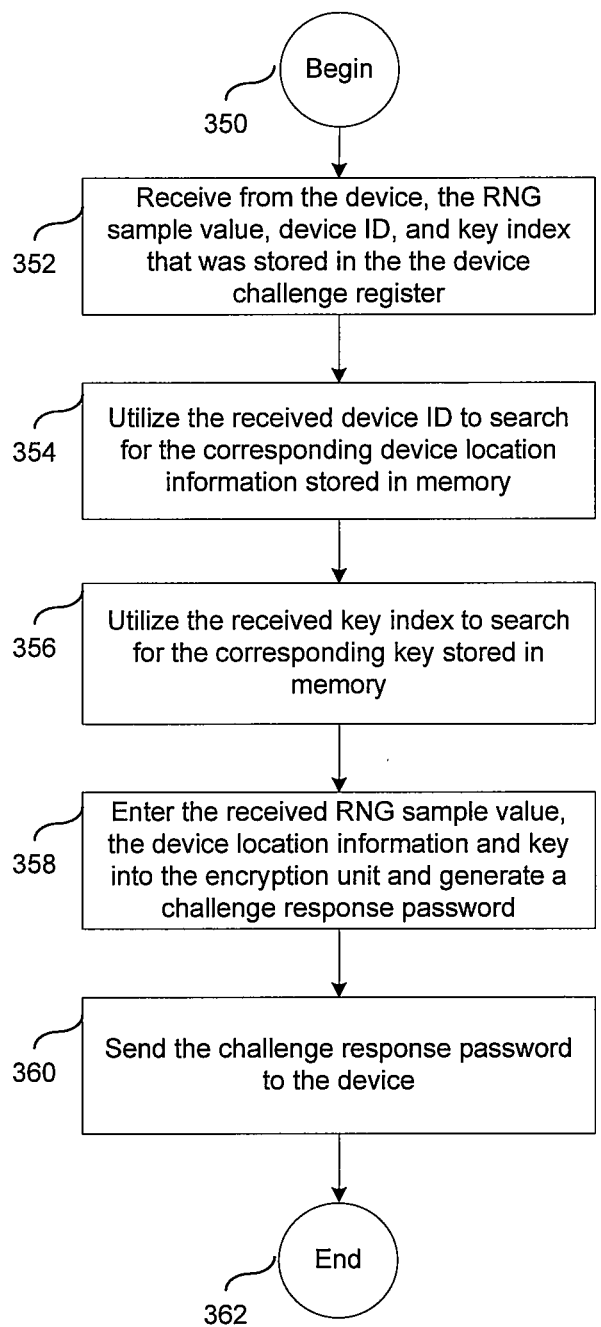
FIG. 3B is a flow chart that illustrates exemplary steps for an authentication process that may utilize GPS location information on an external entity, in accordance with an embodiment of the invention.

FIG. 3B is a flow chart that illustrates exemplary steps on an external entity for an authentication process that may utilize GPS location information, in accordance with an embodiment of the invention. Referring to FIG. 3B, there is shown a flow chart wherein step 350 is a begin step on the external entity during the authentication process. In step 352, the external entity may receive the contents of the challenge register 102 from the device 160 comprising the RNG sample value, the device ID and the key index. In step 354, the external entity may utilize the received device ID to search the NVM 266 for the associated device 160 location information. In step 356, the external entity may utilize the received key index to search for the corresponding key in NVM 210. In step 358, the external entity may enter the received RNG sample value, the device 160 location information from NVM 266 and the key from NVM 210 into the encryption unit 212 and may generate a challenge response password. In step 360, the external entity may send the challenge response password to the device 160.

In some embodiments of the invention, authenticating access to one or more secure functions controlled by a device 160 may utilize a password. The password may be generated on a chip integrated within the device 160 and may be unique per location of the chip, per challenge and/or per a chip. In this regard, a random number sample may be generated within the chip from the random number generator (RNG) 104. Moreover, a location of the chip may be determined based on global positioning system (GPS) information for example, from the satellites 170a, 170b and 170c. The chip location may be stored securely within the chip within NVM 166 or securely on external NVM 120, for example, such that the chip location may be inaccessible by any other external entity. Notwithstanding, the chip location may be securely communicated to a specified external entity, for example the server 150, via the modem 164. In addition, within the chip, a chip ID that is unique to the chip may be stored within NVM 108 and a table of keys comprising a key and key index may be stored within the NVM 110 for example. Accordingly, two or more of the chip location, the generated random number sample and the key from the table of keys may be passed to a hash function within the encryption unit 112. A password may be generated within the chip from the hash function. An external entity 150 attempting access to the chip may be challenged to respond to the chip with a password that matches the password generated from the hash function. As such, two or more of the generated random number sample, the chip ID which is unique to the chip and the key index may be stored in a register 102 and communicated to the external entity 150 attempting to gain access. An authorized external entity such as server 150 may have knowledge of one or more of the chip ID, the location of the chip, the key table with corresponding key indices and the hash function. A response generated by the external entity attempting access may be compared with the password generated from the hash function and access may be granted to one or more secure functions on the chip based on the comparison. In some embodiments of the invention, within the chip, a password may be generated based on a secret word wherein the secret word may be generated utilizing a secure secret algorithm.

Certain embodiments of the invention may comprise a machine-readable storage having stored thereon, a computer program having at least one code section for secure communications, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data in a communication system involving a terminal device challenge, comprising:
   challenging, by a terminal device, a server to provide a first password to perform said terminal device challange;
   providing, by a chip that is integrated within said terminal device, a second password that is unique per location of said chip and per said terminal device challenge;
   comparing, by said terminal device, said first password and said second password; and
   granting, by said terminal device, access to said server to a secure function controlled by said terminal device when said first password matches said second password.

2. The method according to claim 1, further comprising:
   generating, within said chip, said second password.

3. The method according to claim 1, further comprising:
   generating, within said chip, a random number sample from a random number generator (RNG).

4. The method according to claim 1, further comprising:
   generating, within said chip, a secret word that is unique per chip utilizing a secure secret algorithm,
   wherein said second password is generated based on said generated secret word.

5. The method according to claim 1, further comprising:
   determining said location of said chip based on global positioning system (GPS) information.

6. The method according to claim 5, further comprising:
   securely storing said location of said chip, wherein said location of said chip is inaccessible by said server.

7. The method according to claim 5, further comprising:
   securely communicating said location of said chip to a specified server.

8. The method according to claim 5, further comprising:
   storing, within said chip, one or more of: a chip ID that is unique to said chip, a key, and a key index corresponding to said key.

9. The method according to claim 8, further comprising:
   passing two or more of: said location of said chip, a generated random number sample, and said key to a hash function.

10. The method according to claim 9, further comprising:
    generating, within said chip, said second password from said hash function.

11. The method according to claim 9, further comprising:
    storing, in a register, two or more of: said location of said chip, said generated random number sample, said chip ID, and said key index,
    wherein said server, when granted access, has knowledge of two or more of: said chip ID, said location of said chip, said key index, and said hash function.

12. The method according to claim 1, wherein said comparing comprises:
    comparing a response generated by said server with said second password, and
    wherein said granting comprises:
    granting said access to said secure function based on said comparison.

13. The method according to claim 1, further comprising:
    authenticating, by said terminal device, said server when said first password matches said second password.

14. A system for processing data in a communication system which handles a terminal device challenge, comprising:
    a chip integrated in a terminal device; and
    an authentication subsystem, integrated in said terminal device, configured to
    challenge, by said terminal device, a server to provide a first password to perform said terminal device challenge,
    compare said first password to a second password, provided by said chip, that is unique per a location of said chip and per said terminal device challenge, and to
    grant access to said server to a secure function controlled by said terminal device when said first password matches said second password.

15. The system according to claim 14, wherein said authentication subsystem is further configured to generate said second password.

16. The system according to claim 14, further comprising:
    a random number generator (RNG) configured to generate a random number sample.

17. The system according to claim 14, wherein said authentication subsystem is further configured to implement a secure secret algorithm to generate a secret word that is unique per chip, and
    wherein said second password is generated based on said generated secret word.

18. The system according to claim 14, further comprising:
    a global positioning system (GPS) receiver configured to determine said location of said chip based on GPS information.

19. The system according to claim 18, further comprising:
    a secure storage unit configured to securely store said location of said chip, and
    wherein said location of said chip is inaccessible by said server.

20. The system according to claim 18, wherein said system is further configured to securely communicate said location of said chip to a specified server.

21. The system according to claim 18, further comprising:
    a challenge register configured to store, within said chip, one or more of: a chip ID that is unique to said chip, a key, and a key index corresponding to said key.

22. The system according to claim 21, wherein said challenge register is further configured to pass two or more of: said location of said chip, a generated random number sample, and said key to a hash function.

23. The system according to claim 22, further comprising:
    an encryption unit configured to generate, within said chip, said second password from said hash function.

24. The system according to claim 22, wherein said challenge register is further configured to:
    store two or more of: said generated random number sample, said chip ID, and said key index, and
    wherein said server, when granted access, has knowledge of two or more of: said chip ID, said location of said chip, said key index, and said hash function.

25. The system according to claim 24, further comprising:
    a digital comparator unit configured to:
    compare a response generated by said server with said second password generated from said hash function; and
    grant said access to said secure function based on said comparison.

26. The system according to claim 14, wherein said authentication subsystem is further configured to authenticate said server when said first password matches said second password.

* * * * *

UNITED STATES PATENT AND TRADEMARK OFFICE
CERTIFICATE OF CORRECTION

PATENT NO. : 8,887,307 B2  
APPLICATION NO. : 11/871696  
DATED : November 11, 2014  
INVENTOR(S) : Xuemin Chen Page 1 of 1

It is certified that error appears in the above-identified patent and that said Letters Patent is hereby corrected as shown below:

In the Claims

Column 12, line 3, please replace "to" with --to:--.

Column 12, line 8, please replace "and to" with --and--.

Signed and Sealed this  
Fifth Day of May, 2015

Michelle K. Lee  
*Director of the United States Patent and Trademark Office*